(12) United States Patent
Pyatkovskiy (10) Patent No.: US 8,819,245 B2
(45) Date of Patent: Aug. 26, 2014

(54) PROCESSOR ALLOCATION FOR MULTI-CORE ARCHITECTURES

(75) Inventor: Maksim Pyatkovskiy, Encino, CA (US)

(73) Assignee: Ixia, Calabasas, CA (US)

( * ) Notice: Subject to any disclaimer, the term of this patent is extended or adjusted under 35 U.S.C. 154(b) by 500 days.

(21) Appl. No.: 12/951,963

(22) Filed: Nov. 22, 2010

(65) Prior Publication Data

US 2012/0131203 A1    May 24, 2012

(51) Int. Cl.
G06F 15/16    (2006.01)
H04L 12/413   (2006.01)

(52) U.S. Cl.
CPC .................................. *H04L 12/413* (2013.01)
USPC ............ 709/227; 709/230; 709/245; 709/222

(58) Field of Classification Search
USPC .................... 709/227, 230, 245, 222
See application file for complete search history.

(56) References Cited

U.S. PATENT DOCUMENTS

| | | | |
|---|---|---|---|
| 5,724,602 A | 3/1998 | Tanaka et al. | |
| 6,122,670 A | 9/2000 | Bennett et al. | |
| 6,173,333 B1 | 1/2001 | Jolitz | |
| 6,295,557 B1 | 9/2001 | Foss | |
| 6,345,302 B1 | 2/2002 | Bennett et al. | |
| 6,954,463 B1 | 10/2005 | Ma et al. | |
| 7,020,713 B1 * | 3/2006 | Shah et al. ..................... 709/235 | |
| 7,095,716 B1 | 8/2006 | Ke et al. | |
| 7,149,230 B2 | 12/2006 | Coffin, III et al. | |
| 7,443,836 B2 | 10/2008 | Hooper | |
| 7,602,775 B1 | 10/2009 | Ke et al. | |
| 7,809,128 B2 | 10/2010 | Li et al. | |
| 8,352,777 B2 | 1/2013 | Shilon et al. | |
| 2001/0051971 A1 * | 12/2001 | Kato ............................. 709/102 | |
| 2004/0215803 A1 | 10/2004 | Yamada et al. | |
| 2007/0121516 A1 | 5/2007 | Hannel et al. | |
| 2008/0117907 A1 | 5/2008 | Hein | |
| 2010/0008248 A1 | 1/2010 | Constantine et al. | |
| 2010/0061377 A1 * | 3/2010 | Goglin et al. ............ 370/395.32 | |
| 2010/0293280 A1 | 11/2010 | Namihira | |
| 2012/0224486 A1 * | 9/2012 | Battestilli et al. ............. 370/237 | |
| 2014/0122865 A1 * | 5/2014 | Ovsiannikov ................. 713/151 | |

OTHER PUBLICATIONS

Douglas Comer, Internetworking with TCP/IP Principles, Protocols and Architectures. Prentice Hall, 4th Edition, Chapter 7 (p. 95-113), Chapter 13 (p. 197-249), Chapter 32 (p. 581-597).

* cited by examiner

*Primary Examiner* — Lan-Dai T Truong
(74) *Attorney, Agent, or Firm* — SoCal IP Law Group LLP; John E. Gunther; Steven C. Sereboff (57) ABSTRACT

Methods, computing devices, and computer readable storage media for testing network connections are disclosed. A first processor of a plurality of processors may define a new TCP connection. The first processor may apply a hash function to determine an appropriate one of the plurality of processors to open the new TCP connection. The first processor may write data defining the new TCP connection to a queue associated with the appropriate processor. The appropriate processor may retrieve the data defining the new TCP connection from the queue and open the new TCP connection.

16 Claims, 5 Drawing Sheets

PROCESSOR ALLOCATION FOR MULTI-CORE ARCHITECTURES

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating connections for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, and layer 4 of the structure are the physical layer, the data link layer, the network layer, and the transport layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged.

A TCP connection is defined by a source IP address, a destination IP address (fields in the IP header of each packet of the TCP connection), a source TCP port, and a destination TCP port (fields in the TCP header of each TCP packet). TCP ports define what higher level protocol or process is using the services of the TCP connection. A TCP port should not be confused with a hardware port (a connection between a hardware device and a network). The header of each TCP packet contains a sequence number identifying the first data byte in the TCP packet, and an acknowledgement number identifying the next data byte expected to be received. The sequence and acknowledgement numbers are, in simplified terms, a count of the number of data bytes sent and received, respectively, over the TCP connection. Two devices communicating via a TCP connection maintain data indicating the highest sequence number transmitted and the highest acknowledgement number received. This information can be used to retransmit packets that are not acknowledged in a timely manner.

During normal network operation, TCP connections are typically opened, or initiated, by a client device requesting information or some other service from a server device. The client device may be, for example, a user computer sending and receiving HTTP messages as the user surfs the World Wide Web, or SMTP e-mail messages. The client device may have a single IP address and only one or two processor cores. The client device may have only a few TCP connections open concurrently, and may send TCP packets infrequently in response to user actions. The server may be a Web server or an e-mail server or other server. The server may have multiple processors or processor cores and may be capable of maintaining a large number of concurrent TCP connections.

A problem may arise if two or more of the processors in a client or server are allowed to process packets for the same TCP connection. Specifically, if a first TCP packet is being processed by a first processor and a second TCP packet for the same TCP connection is concurrently processed by a second processor, the second processor may read the TCP connection data before the first processor has updated the TCP connection data. Subsequently, the second processor will update and store the TCP connection data in ignorance of the first packet, such that the stored TCP connection data is inaccurate. Such concurrency issues may be avoided by synchronizing or restricting access to the TCP connection data. However, restricting access to the TCP connection data can, in some circumstances, lead to two or more processors stalled while attempting to access the same connection data. To avoid such problems, each TCP connection may be uniquely associated with a specific one of the server's multiple processor cores. In this patent, the term "uniquely associated" means there is a one-to-one correspondence between two groups of items.

For example, a hash function may be used to uniquely associate each received TCP packet, and thus each TCP connection, to a specific processor core. A hash function is any algorithm or mathematical function that converts a larger amount of data into a smaller amount of data, typically a single integer. The value returned by a hash function is called hash value. For example, a checksum is a hash value returned by successively adding portions of a larger string of data such as a packet.

Assuming the layer 3 protocol is IP.v4, each TCP connection is defined by a 32-bit IP source address, a 32-bit IP destination address, a 16-bit TCP source port number and a 16-bit TCP destination port number. Every packet transmitted or received via the TCP connection will contain the same two 32-bit IP addresses and two 16-bit TCP port numbers within the header of the packet. Thus each TCP connection is defined by a 96-bit number, obtained by concatenating the two 32-bit IP addresses assuming (IP.v4) and two 16-bit TCP port numbers, allowing a total of $2^{96}$ or $8\times10^{28}$ unique TCP connections.

To uniquely associate every possible TCP connection with one of the server's processors, a hash function may be used to convert the 96-bit number that defines each TCP connection into a value that identifies the associated processor. For example, if a server includes eight processors, a hash function may provide a 3-bit hash value that identifies a single one of the eight processors. The hash function may be implemented by hardware or software.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. Each packet in the test traffic may be a unicast packet intended for reception at a specific destination port or a multicast packet, which may be intended for reception at two or more destination ports. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

To test the layer 4 performance of a packet switched network or a network device, the test traffic may be or include a large plurality of stateful connections between one or more test port units and the network or device under test. The stateful connections may be intermingled with a large volume of stateless, or non-stateful, packets as described, for example, in U.S. Pat. No. 7,496,664 B2 and U.S. Pat. No. 7,194,535 B2. During network testing, port units of a network test equipment may function as both the client and server sides of a large number of TCP connections. Each port unit may emulate a large plurality of servers and/or a large plurality of clients.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
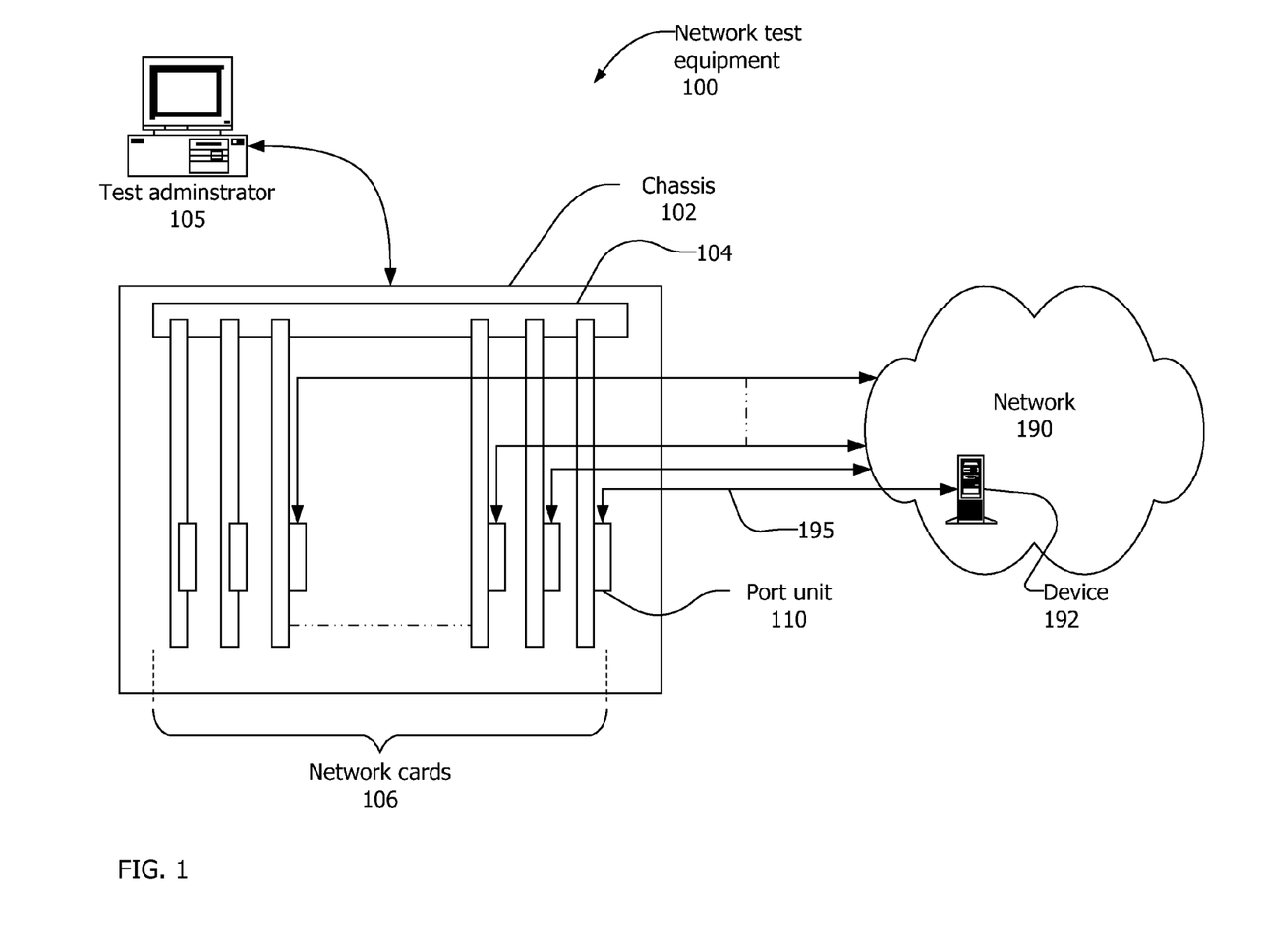
FIG. 1 is a block diagram of a network environment.

FIG. 1 shows a block diagram of a network environment. The environment may include network test equipment 100, a network 190 and plural network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors, and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may contain one or more port unit 110. Each port unit 110 may connect to the network 190 through one or more ports. Each port unit 110 may be connected to the network 190 through a communication medium 195, which may be a wire, an optical fiber, a wireless link, or other communication medium. Each network card 106 may support a single communications protocol, may support a number of related protocols, or may support a number of unrelated protocols. The network cards 106 may be permanently installed in the network test equipment 100 or may be removable.

The backplane 104 may serve as a bus or communications medium for the network cards 106. The backplane 104 may also provide power to the network cards 106.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 195. The network itself may be comprised of numerous nodes providing numerous physical and logical paths for data to travel.

Figure 2:
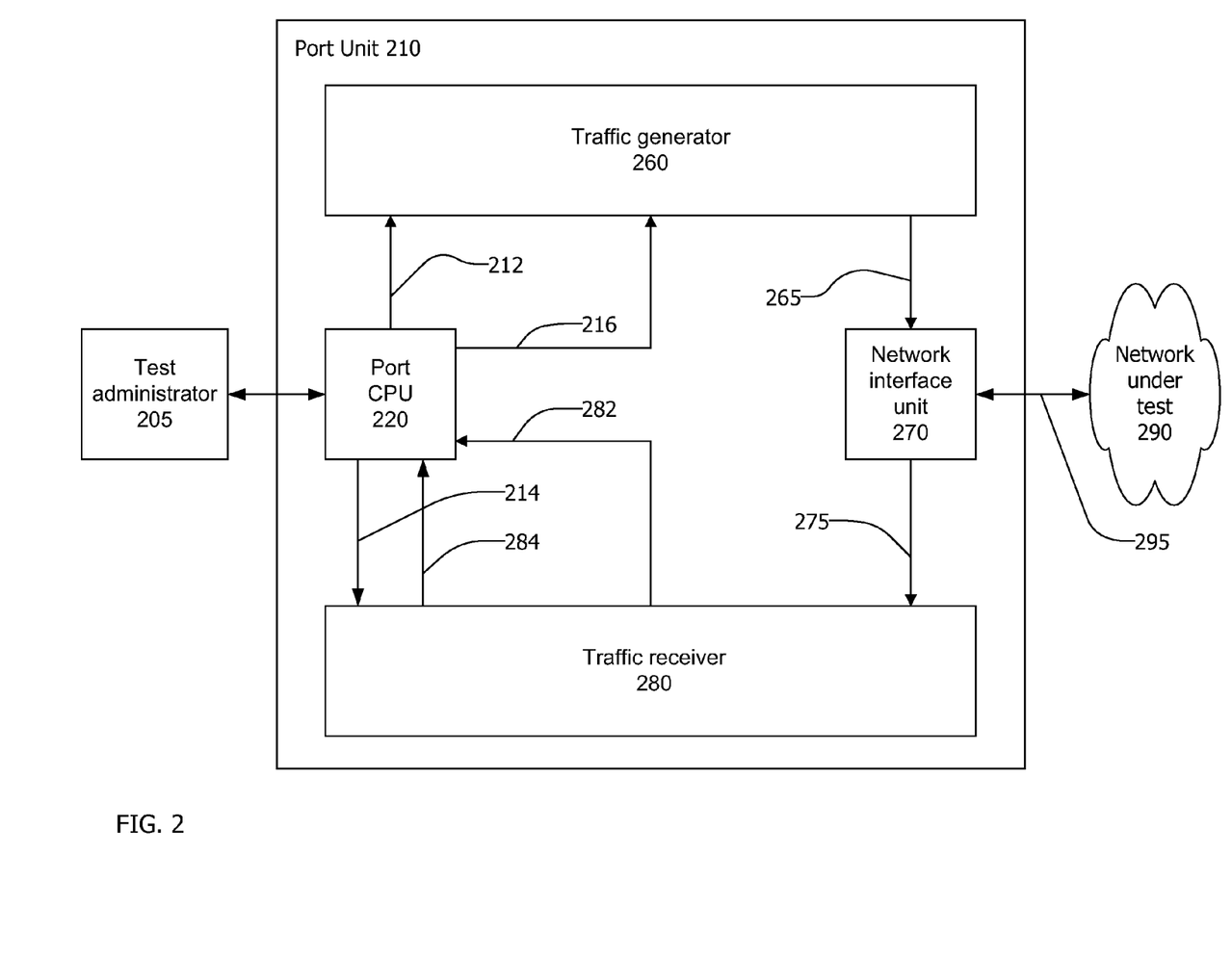
FIG. 2 is a block diagram of a port unit.

Referring now to FIG. 2, an exemplary port unit 210 may include a port central processing unit (CPU) 220, a traffic generator 260, a traffic receiver 280, and a network interface unit 270 which couples the port unit 210 to a network under test 290. The port unit 210 may be all or part of a network card such as the network cards 106.

The port CPU 220 may include one or more processors, a memory coupled to the processors, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 220 may communicate with a test administrator 205. The test administrator 205 may be a computing device contained within, or external to, the network test equipment 100. The test administrator 205 may provide the port processor 222 with instructions and data required for the port unit to participate in testing the network under test 290. The instructions and data received from the test administrator 205 may include, for example, definitions of packet streams to be generated by the port unit 210 and definitions of performance statistics that may be accumulated and reported by the port unit 210.

The port CPU 220 may provide the traffic generator 260 with stream forming data 212 to form a plurality of streams. The stream forming data 212 may include, for example, the type of packet, the frequency of transmission, definitions of fixed and variable-content fields within the packet and other information for each packet stream. The traffic generator 260 may then generate the plurality of streams in accordance with the stream forming data 212. The plurality of streams may be interleaved to form outgoing test traffic 265. Each of the streams may include a sequence of packets. The packets within each stream may be of the same general type but may vary in length and content.

The network interface unit 270 may convert the outgoing test traffic 265 from the traffic generator 260 into the electrical, optical, or wireless signal format required to transmit the test traffic to the network under test 290 via a link 295, which may be a wire, an optical fiber, a wireless link, or other communication link. Similarly, the network interface unit 270 may receive electrical, optical, or wireless signals from the network over the link 295 and may convert the received signals into incoming test traffic 275 in a format usable to the traffic receiver 280.

The traffic receiver 280 may receive the incoming test traffic 275 from the network interface unit 270. The traffic receiver 280 may determine if each received packet is a member of a specific flow, and may accumulate test statistics for each flow in accordance with test instructions 214 provided by the port CPU 220. The accumulated test statistics may include, for example, a total number of received packets, a number of packets received out-of-sequence, a number of received packets with errors, a maximum, average, and minimum propagation delay, and other statistics for each flow. The traffic receiver 280 may also capture and store selected packets in accordance with capture criteria included in the test instructions 214. The traffic receiver 280 may provide test statistics and/or captured packets 284 to the port CPU 220, in accordance with the test instructions 214, for additional analysis during, or subsequent to, the test session.

At least a portion of the outgoing test traffic 265 and the incoming test traffic 275 may be stateless, which is to say that a portion of the outgoing test traffic 265 may be generated by the traffic generator 260 without expectation of any response and the incoming test traffic 275 may be received by the traffic receiver 280 without any intention of responding. The transmission and reception of stateless traffic may be sufficient to perform layer 2 and layer 3 testing of the network under test 290. However, to test the layer 4 (or higher) performance of a network device such as a server or server load balancer, a large number of TCP connections may be required between the port unit 210 and the network under test 290 during a test session.

To establish and use TCP connections, the port CPU 220 may prepare appropriate TCP packets and provide the TCP packets 216 to the traffic generator 260. The traffic generator 260 may insert the TCP packets into the outgoing test traffic 265. The traffic receiver 280 may separate received TCP packets from received stateless traffic and send the received TCP packets 282 to the port CPU 220 for processing.

Figure 3:
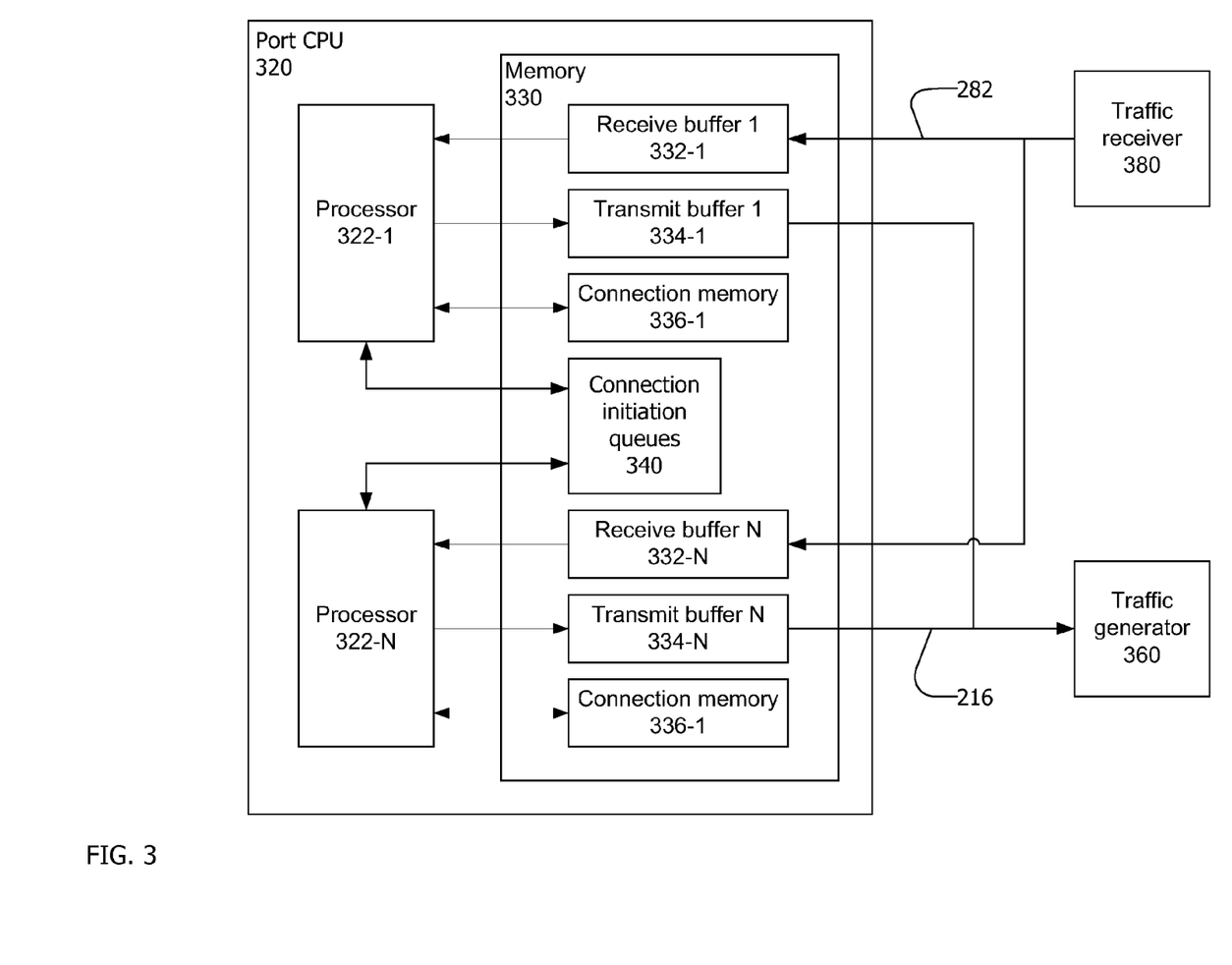
FIG. 3 is a block diagram of a port CPU.

Referring now to FIG. 3, a port CPU 320 may include a plurality of N processors, wherein N is an integer greater than one, of which only processors 322-1 and 322-N are shown. Each of the processors 322-1 to 322-N may be 322 coupled to a memory 330. Each processor 322-1 to 322-N may have equal access to the entire memory 330 in what is commonly called a symmetric multiprocessor architecture. Alternatively, the memory 330 may include local memory (not shown) associated with each of the processors 322-1 to 322-N in what is commonly called a non-uniform memory access (NUMA) architecture. Within a NUMA architecture, each processor 322-1 to 322-N may access its own local memory faster than non-local memory, where non-local memory may include memory local to another processor or memory shared between processors. The processors 322-1 to 322-N may be processor cores within one or more integrated circuit devices.

The memory 330 may include random access memory, or a combination of random access memory and other memory such as read-only memory. The memory 330 may include a storage device. As used herein, a storage device is a device that allows for reading and/or writing to a machine readable storage medium. Storage devices include hard disk drives, DVD drives, flash memory devices, and others. Machine readable storage media include, for example, magnetic media such as hard disks, floppy disks and tape; optical media such as compact disks (CD-ROM and CD-RW) and digital versatile disks (DVD and DVD±RW); flash memory cards; and other media for storing data. The term "storage media" does not include transient media, such as signals and waveforms, for conveying data.

The memory 330 may store both data and program instructions for execution by the processors 322-1 to 322-N. Program instructions may be stored on a machine readable storage media and copied into random-access memory during execution.

The memory 330 may include a plurality of N received packet buffers, of which received packet buffers 332-1 and 332-N are shown. Each received packet buffer 332-1 to 332-N may be uniquely associated with a corresponding one of the processor 322-1 to 322-N. In this patent, the term "uniquely associated" means there is a one-to-one correspondence between two groups of items. Each received packet buffer 332-1 and 332-N may have capacity to store at least the longest anticipated received packet. Each received packet buffer 332-1 and 332-N may have capacity to store multiple received packets. A traffic receiver 380 may write received packets into the received packet buffer 332-1 and 332-N, for example using direct memory access. After each received packet is stored in one of the received packet buffers 332-1 and 332-N, the traffic receiver 380 may send a signal (such as an interrupt, a flag, or another signal) to the corresponding processor 322-1 to 322-N indicating that a received packet is waiting.

When a port unit is emulating a server, a hash function may be used to ensure that all packets for a specific TCP connection are processed by the same processor 322-1 to 322-N, and to ensure that a plurality of TCP connections are distributed evenly among the processors 322-1 to 322-N. For example, hardware within the traffic receiver 380 may apply a predetermined hash function to determine which processor 322-1 to 322-N is uniquely associated with each received TCP packet. The traffic receiver 380 may then cause the received TCP packet to be placed in the receive buffer 332-1 to 332-N of the associated processor.

The memory 330 may include a plurality of transmit packet buffers, of which transmit packet buffer 334-1 and 334-N are shown. Each of the plurality of transmit packet buffers 334-1 to 334-N may be uniquely associated with a corresponding one of the plurality of processor 322-1 to 322-N. Each transmit packet buffer 334-1 to 334-N may have capacity to store at least the longest anticipated outgoing packet. Each transmit packet buffer 334-1 to 334-N may have capacity to store multiple outgoing packets. Each processor 322-1 to 322-N may write one or more packets to be transmitted into the associated transmit packet buffer 334-1 to 334-N. After each packet to be transmitted is stored, the processor 322-1 to 322-N may send a signal (such as a flag, or another signal) to a traffic generator 360 indicating that a packet to be transmitted is waiting in a transmit packet buffer 322-1 to 322-N. The traffic generator 360 may then extract the packet to be transmitted from the transmit packet buffer 322-1 to 322-N, for example by direct memory access.

Each processor 322-1 to 322-N may run a program or a plurality of program layers for implementing a TCP/IP stack. Each layer in the TCP/IP stack may implement one or more communications protocols. Layer 4 of the TCP/IP stack may include a TCP protocol program that causes the processor to open, manage, and close TCP connections with or through a network under test (not shown). For each TCP connection, the TCP protocol program may store TCP connection data in the memory 330. The stored TCP connection data may include, for example, the state of the connection, the highest sequence number transmitted, and the highest sequence number acknowledged. The TCP connection data may be read before each received or outgoing packet is processed and may be updated and stored after the processing of each received or outgoing packet is completed.

Some or all of the processors 322-1 to 322-N may perform other functions and execute other programs in addition to processing TCP packets. Some or all of the processors 322-1 to 322-N may execute other programs during intervals between processing TCP packets. In particular, when a port unit is emulating a plurality of clients during a test session, one or more of the processors 322-1 to 322-N may execute a program to define a plurality of new TCP connections to be opened. The port CPU 320 may receive instructions, for example from a test administrator, such as the test administrator 205, to open a plurality of new TCP connections. One or more processors 322-1 to 322-N may then be tasked to define the new TCP connections in accordance with the instructions.

A network test session is typically performed in accordance with a test scenario that is designed prior to conducting the tests. In a test scenario, each port unit of the test equipment may be assigned to emulate a plurality of client devices having different, but known, source IP addresses and may be tasked to establish TCP connections with a limited number of IP destination addresses and destination TCP port numbers. Thus the total number of possible TCP connections for each port unit is limited, but still may number millions or 10's of millions of possible connections. Each new TCP connection may be defined by defining an IP source address, and IP destination address, a TCP source port, and a TCP destination port. The IP addresses and TCP ports may be defined in accordance with test scenario. For example, the IP addresses and TCP ports may be selected randomly or sequentially with a range or lists of values defined in the test scenario.

In order to establish and maintain as many TCP connections as possible, each TCP connection may be uniquely associated with a specific processor 322-1 to 322-N within the port unit. However, the processor that initially defines a new TCP connection might not be the same processor that will process packets received via the new TCP connection. The processor that defines a new TCP connection may provide definition data defining the new TCP connection to the processor that will open and manage the new TCP connection via a plurality of connection initiation queues 340. Specifically, a first processor of the plurality of processors 322-1 to 322-N may define a new TCP connection and store definition data into an appropriate queue of the plurality of connection initiation queues 340. A second processor of the plurality of processors 322-1 to 322-N may then read the definition data and open the new TCP connection accordingly.

Figure 4:
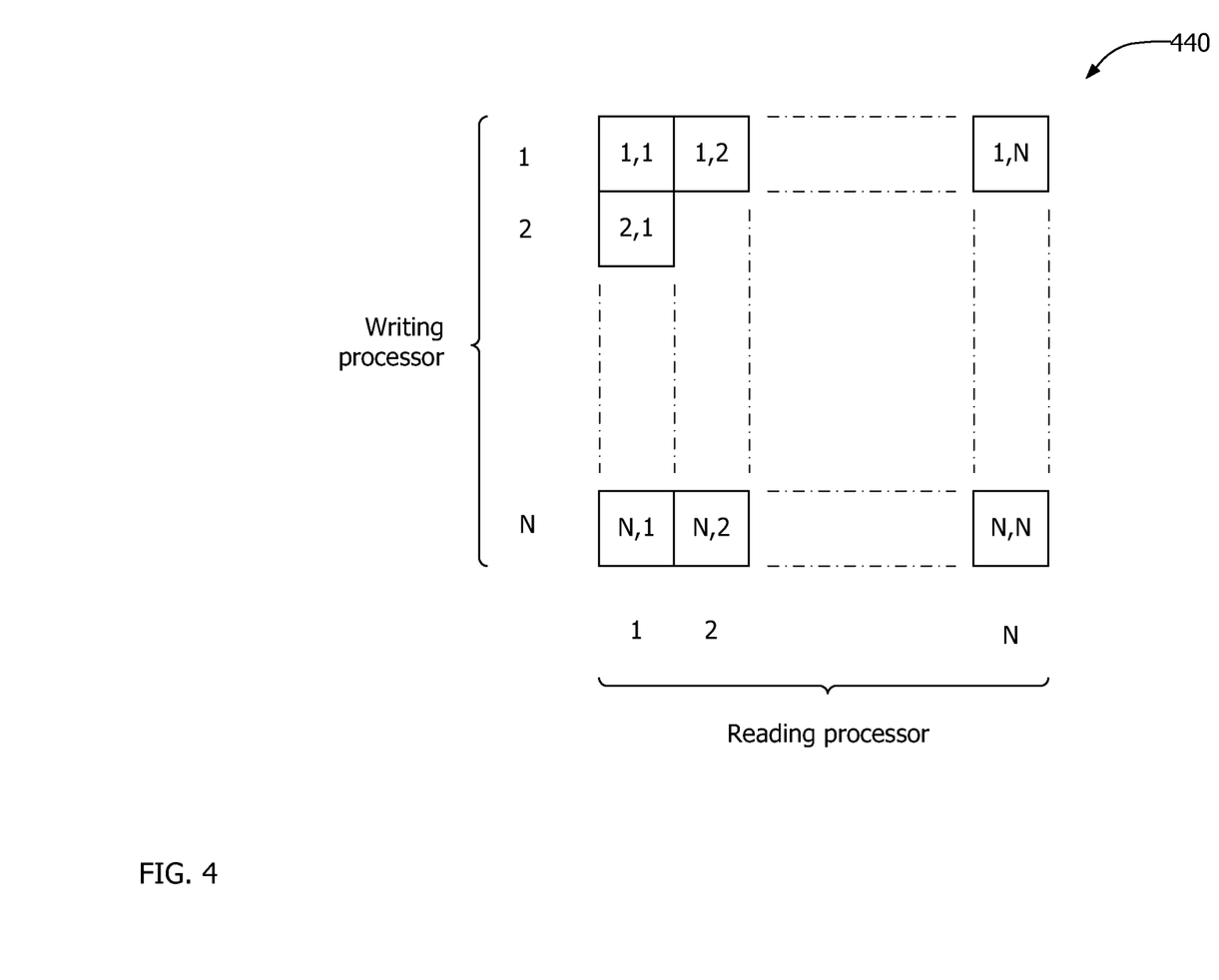
FIG. 4 is a graphical representation of connection initiation queues.

Referring now to FIG. 4, a set of connection initiation queues, which may be suitable for use as the connection initiation queue 340, may be configured as an array 440 of N rows of N queues. In FIG. 4, each queue is labeled with the corresponding row and column number (1,1) to (N,N). Each queue may be configured to store data defining one or more TCP connections. The data defining each TCP connection may include an IP source address, an IP destination address, a TCP source port, and a TCP destination port. The data defining each TCP connection may include other information, such as instructions for the number and type of packets to be communicated via the TCP connection during a test session.

Each row of the array 440 may be uniquely associated with a corresponding one of N processors. Only the associated processor may write to the queues within each row. Similarly, each column of the array 440 may be uniquely associated with a corresponding one of the N processors. Only the associated processor may read data from the queues within each column.

Description of Processes

Figure 5:
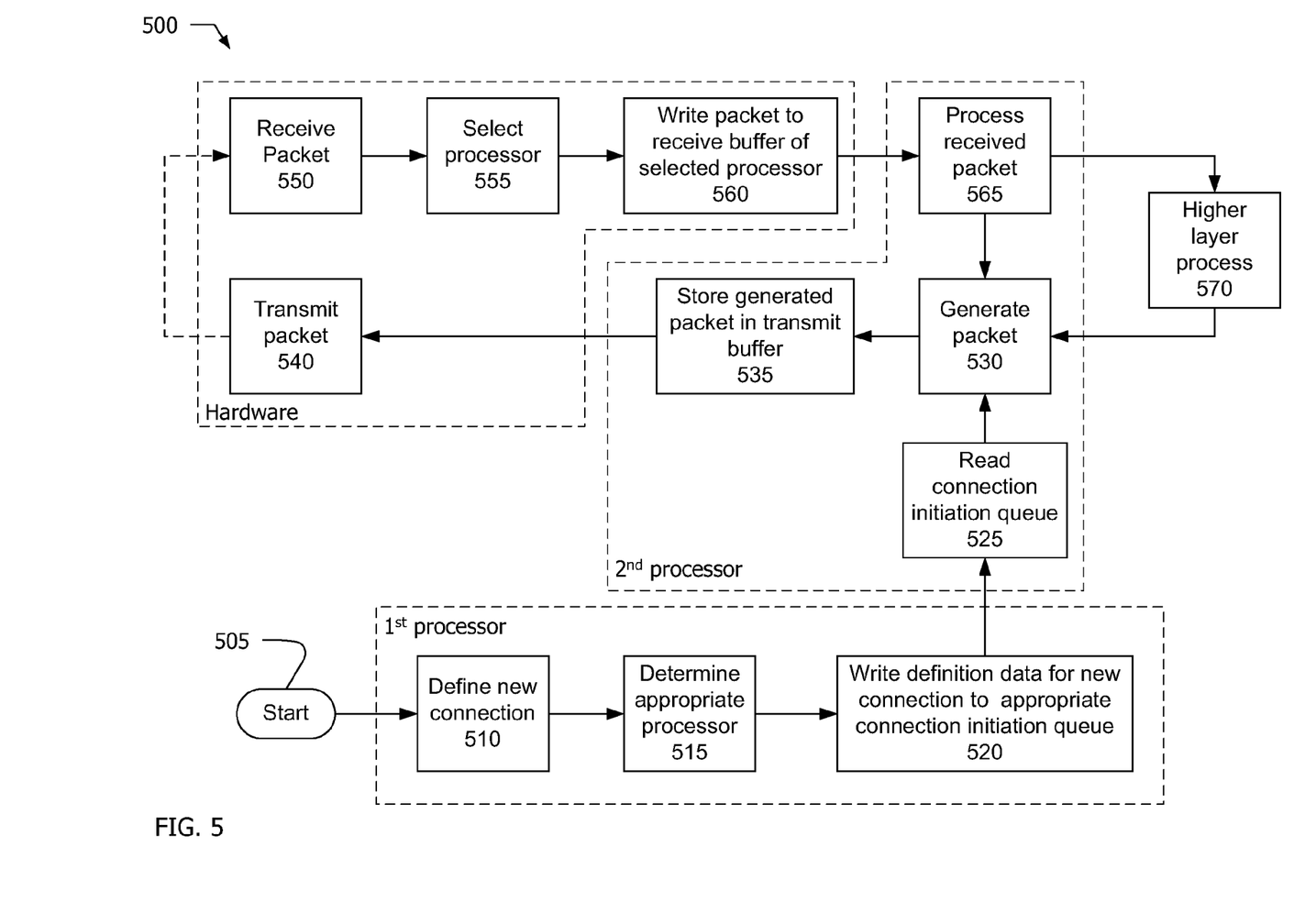
FIG. 5 is a flow chart of a process for managing a TCP connection.

Referring now to FIG. 5, a process 500 for opening and managing a TCP connection during a test session may begin at 505 when instructions to open the TCP connection are received at a port CPU such as the port CPU 320. The process 500 may be cyclic in nature, and the actions from 530 to 570 may be performed repeatedly to exchange a plurality of packets with the remote device via the TCP connection. Multiple instances of the process 500 may be performed concurrently to establish and maintain a large plurality of concurrent TCP connections.

When an instruction to open a new TCP connection is received at 505, a first processor of a plurality of processors within the port CPU may be tasked to define the new TCP connection. Defining a new TCP connection may include defining source and destination IP addresses and source and destination TCP ports. The source and destination IP addresses and the source and destination TCP ports may be defined in accordance with the instruction received at 505. For example, source and destination IP addresses and source and destination TCP ports may be selected sequentially or randomly within predetermined value ranges defined in the instruction received at 505.

After a new TCP connection is defined at 510, the appropriate processor to open and manage the TCP connections may be determined at 515. As previously described, at 515 a hash function may be applied to the source and destination IP addresses and source and destination TCP ports selected at 510. The hash function may generate a hash value indicative of the appropriate processor to open and manage the new TCP connection.

Once the appropriate processor to open the new TCP connection is determined at 515, the first processor may write definition data defining the new connection into a connection initiation queue. For example, when the connection initiation queue is configured as an array as shown in FIG. 4, the first processor may write the definition data into a queue at the intersection of a row associated with the first processor and a column associated with a second processor that is the appropriate processor to open the new TCP connection. The definition data may include the source and destination IP addresses, the source and destination TCP ports, and other information.

After the definition data is written to the appropriate queue at 520, the second processor may read the definition data from the queue at 525. The second processor may then open a new TCP connection in accordance with the definition data. To open the new TCP connection, the second processor may generate a SYN (synchronize sequence numbers) packet at 530. At 535, the second processor may store the SYN packet generated at 530 to a transmit buffer, such as one of the transmit buffers 334-1 to 334-N, uniquely associated with the second processor. At 540, the SYN packet may then be extracted from the transmit buffer and transmitted to a remote device by hardware elements such as the traffic generator 260 and the network interface unit 270.

In response to the transmitted SYN packet, hardware elements (such as the network interface unit 270 and the traffic receiver 280) may receive a packet from the remote device acknowledging the SYN packet at 550. At 555, the hardware elements may determine which processor of the plurality of processors should process the received packet. As previously described, a hash function may be applied to the IP addresses and TCP ports identified in the header of the received packet. The hash function may return a hash value indicative of the appropriate processor to process the received packet. Since the hash value is the same for all packets transmitted or received over a specific TCP connection, a determination may be made at 555 that the second processor (the processor that generated the SYN packet) should process the received response packet. At 560, the received packet may be written into a receive buffer memory, such as one of the receive buffers 332-1 to 332-N, associated with the second processor.

At 565, the second processor may retrieve the received packet from the receive buffer and process the packet. Processing the received packet may include processing the received packet through a TCP/IP protocol stack, which is to say performing processes necessary to implement layer 2, layer 3, and layer 4 protocols of the TCP/IP protocol suite. Processing the received packet may include forwarding at least some content from the packet to a higher layer process 570. The higher layer process 570 may be, for example, an application program running on the second processor.

Processing the received packet at 565 may also include determining information, such as an acknowledgment number, to be included in the next packet transmitted to the remote device.

The process from 530 to 570 may then be repeated cyclically until the TCP connection is closed. The TCP connection may be closed by mutual agreement between the second processor and the remote device, for example when there is no further information to exchange via the TCP connection. The TCP connection may be closed unilaterally, for example when the remote device does not respond within a predetermined time period.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method performed by a test system to test network connections, comprising:
    a first processor of a plurality of processors defining a new TCP connection;
    the first processor applying a hash function to determine a second processor of the plurality of processors to open the new TCP connection;
    the first processor writing data defining the new TCP connection to a queue associated with the second processor, the queue one of an N×N array of queues, where N is a number of processors in the plurality of processors; and
    the second processor retrieving the data defining the new TCP connection from the queue and transmitting a TCP SYN packet to initiate opening the new TCP connection in accordance with the retrieved data.

2. The method of claim 1, wherein
    each row of the N×N array of queues is uniquely associated with a corresponding one of the plurality of processors that writes data to the queues in the row, and
    each column of the N×N array of queues is uniquely associated with a corresponding one of the plurality of processors that retrieves data from the queues in the column.

3. The method of claim 1, wherein defining a new TCP connection includes defining at least a source IP address, a destination IP address, a source TCP port, and a destination TCP port.

4. The method of claim 3, wherein applying the hash function comprises applying the hash function to the source IP address, the destination IP address, the source TCP port, and the destination TCP port to generate a hash value indicative of the second processor.

5. The method of claim 4, further comprising:
    receiving at least one packet from a remote device via the new TCP connection; and
    applying the hash function to a source IP address, a destination IP address, a source TCP port, and a destination TCP port extracted from a header of the received packet to generate the hash value indicative of the second processor.

6. The method of claim 5, further comprising:
    the second processor processing the received packet through a TCP/IP protocol stack.

7. A computing device, comprising:
    a plurality of processors; and
    a memory shared by the plurality of processors;
    wherein a first processor of the plurality of processors executes stored instruction causing the first processor to perform actions comprising:
        defining a new TCP connection,
        applying a hash function to determine a second processor of the plurality of processors to open the new TCP connection, and
        writing data defining the new TCP connection to a queue associated with the second processor within the shared memory, the queue one of an N×N array of queues, where N is a number of processors in the plurality of processors;
    wherein the second processor executes stored instructions causing the second processor to perform actions comprising:
        retrieving the data defining the new TCP connection from the queue and transmitting a TCP SYN packet to initiate opening the new TCP connection in accordance with the retrieved data.

8. The computing device of claim 7, wherein
    each row of the N×N array of queues is uniquely associated with a corresponding one of the plurality of processors that writes data to the queues in the row, and
    each column of the N×N array of queues is uniquely associated with a corresponding one of the plurality of processors that retrieves data from the queues in the column.

9. The computing device of claim 7, wherein defining a new TCP connection includes defining at least a source IP address, a destination IP address, a source TCP port, and a destination TCP port.

10. The computing device of claim 9, wherein applying the hash function comprises applying the hash function to the source IP address, the destination IP address, the source TCP port, and the destination TCP port to generate a hash value indicative of the second processor.

11. The computing device of claim 10, further comprising:
    network interface hardware to transmit and receive packets via a network, the network interface hardware configured to:
        receive a packet from a remote device via the new TCP connection,
        apply the hash function to a source IP address, a destination IP address, a source TCP port, and a destination TCP port extracted from a header of the received packet to generate the hash value indicative of the second processor, and
        write the received packet to a receive buffer associated with the second processor within the shared memory.

12. The computing device of claim 11, the actions performed by the second processor further comprising:
    retrieving the received packet from the receive buffer associated with the second processor; and
    processing the received packet through a TCP/IP protocol stack.

13. A machine-readable storage medium storing instructions that, when executed by a computing device having a plurality of processors, causes actions including:
    a first processor of the plurality of processors performing actions including:
        defining a new TCP connection,
        applying a hash function to determine a second processor of the plurality of processors to open the new TCP connection, and
        writing data defining the new TCP connection to a queue associated with the second processor, the queue one of an N×N array of queues, where N is a number of processors in the plurality of processors; and
    the second processor performing actions including:
        retrieving the data defining the new TCP connection from the queue and transmitting a TCP SYN packet to initiate opening the new TCP connection in accordance with the retrieved data.

14. The machine-readable storage medium of claim 13, wherein
    each row of the N×N array of queues is uniquely associated with a corresponding one of the plurality of processors that writes data to the queues in the row, and each column of the N×N array of queues is uniquely associated with a corresponding one of the plurality of processors that retrieves data from the queues in the column.

15. The machine-readable storage medium of claim 13, wherein defining a new TCP connection includes defining at least a source IP address, a destination IP address, a source TCP port, and a destination TCP port.

16. The machine-readable storage medium of claim 15, wherein applying the hash function comprises applying the hash function to the source IP address, the destination IP address, the source TCP port, and the destination TCP port to generate a hash value indicative of the second processor.

* * * * *